Sept. 1, 1936.          A. WEILAND          2,052,589
CUSHION SUPPORT
Filed Sept. 30, 1933

INVENTOR
A. WEILAND
BY
ATTORNEY

Patented Sept. 1, 1936

2,052,589

UNITED STATES PATENT OFFICE 2,052,589

CUSHION SUPPORT

Alfred Weiland, Philadelphia, Pa., assignor to Baldwin-Southwark Corporation, a corporation of Delaware Application September 30, 1933, Serial No. 691,634

8 Claims. (Cl. 16—42)

This invention relates generally to improved means for resiliently supporting relatively heavy articles such as air conditioning units for rooms, offices or the like, although my improved support may be used with any other articles.

Various attempts have been made to provide a foot support that will be economical in manufacture and maintenance, simple in construction and readily adapted for adjustment but such prior devices are believed to be deficient in fully accomplishing the desired results, particularly where articles of relatively large weight are involved together with the necessity of cushioning or damping vibrations emanating from the supported article.

It is one object of my invention to accomplish all or certain of the features above mentioned in a relatively simple and economical manner. A further object is to provide an improved combination adapted to effectively resiliently support an article and to cushion or damp out vibrations that might emanate from such article. A further object in this respect is to provide a support having resilient material such as rubber, for example, together with improved means for breaking up or damping out any harmonic vibration that might be set up in the supported article. More specifically this is accomplished by providing an air chamber in combination with the resilient supporting material.

In one specific aspect of the invention, I provide concentric members secured together as by a piece of annular rubber which may be vulcanized to said members while an air chamber is formed beneath said resilient material specifically by the provision of a floor engaging element secured to the outer one of said concentric members, thereby permitting the inner member to be secured to the frame of the article to be supported. The central member is provided preferably with a threaded stem for adjusting the elevation of the supported article.

Other objects and advantages will be more apparent to those skilled in the art from the following description of the accompanying drawing in which.

Figure 1:
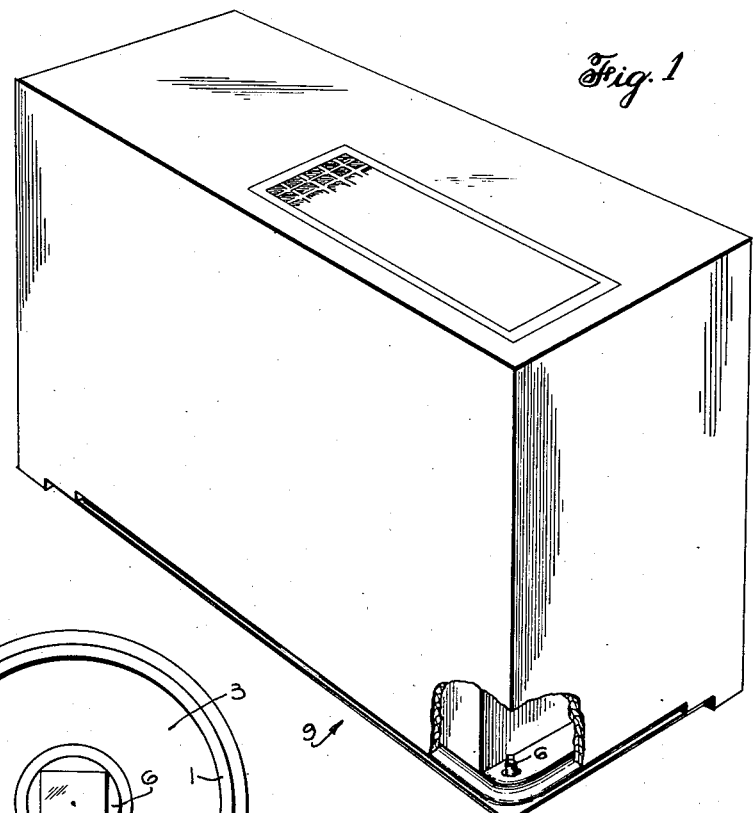
Fig. 1 is a perspective of any suitable article to be supported such as an air conditioning unit for homes or offices.
Figure 3:
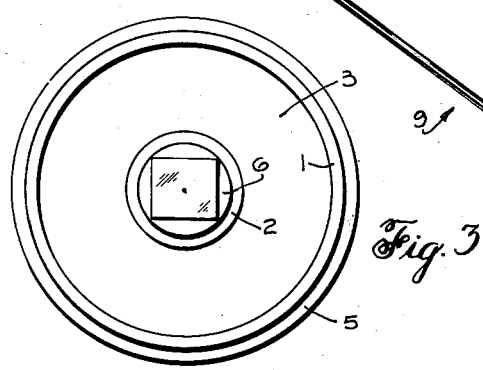
Fig. 3 is a plan view thereof.
Figure 2:
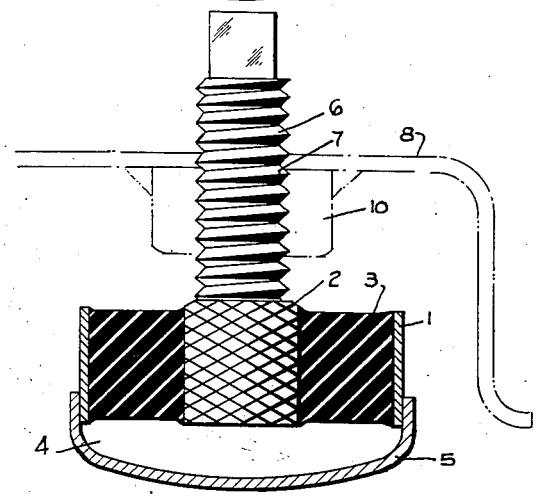
Fig. 2 is a vertical section through my improved support.

In the particular embodiment of the invention which is shown herein merely for the purpose of disclosing one specific form among possible others that the invention might take in practice, I have shown a preferably circular outer sheet metal band member 1 and an inner member 2 preferably arranged concentric to member 1, these two members being resiliently secured together preferably by an annular rubber filler 3 which may be vulcanized or otherwise suitably secured to said members. It will of course be understood that the vulcanizing surfaces of these members may be roughened or otherwise treated so as to insure a tight bond with the rubber or other resilient material that may be used.

To provide an air cushion or chamber 4, a preferably cup-shaped floor engaging element 5 has preferably a close nested fit with the lower portion of band 1, these two elements if necessary being welded in spots or continuously around their entire circumference. Irrespective of whether the joint between the members 1 and 5 is air-tight, these members cooperate with the resilient material 3 to form a sufficient air cushion in chamber 4 so as to provide a definite cushion together with a damping action for any vibration that is transmitted to the central member 2. The two members 1 and 5 broadly constitute an outer enclosure or casing irrespective of the number of pieces out of which it may be made. The bottom of the cup-shaped member 5 also broadly constitutes a transverse air chamber wall.

The member 2 is provided with a stem 6 for adjustable threaded engagement with an opening 7 in the frame 8 of an article to be supported such as a room cooler unit 9. The threads in frame 8 may be formed as by welding a nut 10 thereto preferably on the under side thereof. To effect vertical adjustment of frame 8, a wrench may be applied to the upper end of stem 6 which preferably is provided with a square end to receive the wrench. This end is readily accessible due to projecting above the top of base 8 and may be rotated relatively easily due to the convex surface of the floor engaging slide element 5. It will of course be understood that as many of the glides will be used as may be required to properly support and balance an article.

From the foregoing disclosure it is seen that I have provided an extremely simple and yet sturdy and efficient foot support or glide that may be readily adjusted while at the same time permitting necessary resiliency to cushion the unit against vibration, the air chamber 4 efficiently functioning to supplement the cushioning action and also to break up any harmonic vibration that might be set up in the unit or caused by various conditions. These results are accomplished irrespective of whether the inner or outer member serves as the fixed support as by engaging the floor or an equivalent fixed abutment.

It will of course be understood that various changes in details of construction and arrangement of parts may be made by those skilled in the art without departing from the spirit of the invention as set forth in the appended claims.

I claim:

1. A support comprising a member adapted for connection to an article to be supported; floor engaging means; means forming a substantially vertical wall with respect to said floor engaging means; and means forming a closed yieldable air chamber between said floor engaging means, wall and member, including a rubber portion bonded to said member and to said wall to permit relative movement therebetween.

2. A support comprising, in combination, a member adapted for connection to an article to be supported, a casing adapted for engagement with the floor, and a rubber element permanently bonded to said member and casing for resiliently connecting the same together, said rubber element and member being spaced from the bottom of the casing thereby to form an air cushion chamber.

3. A support comprising an inner member, an outer member surrounding said inner member in spaced relation thereto, resilient material bonded to said members to close said space therebetween, and means connected to said outer member and disposed in spaced relation to said inner member and to said bonding material to provide an air chamber on the under side of said inner member and material, said inner member being adapted for connection to the article to be supported.

4. A support comprising an inner member, an outer member surrounding said inner member in spaced relation thereto, resilient material inseparably connected to said members to close said space therebetween, means including said material for forming a substantially closed air chamber beneath said resilient material, and means whereby said inner member is adapted for connection to an article to be supported whereby the weight of said article is supported through said resilient material and the air in said chamber.

5. A support comprising an inner member, an outer member surrounding said inner member in spaced relation thereto, resilient material inseparably connected to said members to close said space therebetween, a cup-shaped floor engaging member secured to said outer member to form an air chamber beneath said resilient material by cooperating therewith, and means for connecting said inner member to an article to be supported.

6. A support comprising inner and outer concentrically spaced members, an annular rubber element disposed within said space to entirely fill the same and being permanently bonded to said members so as to be solely under shearing and tension forces, a cup-shaped floor engaging element nested with said outer member, and a threaded stem connected to said inner member for adjustable threaded engagement with an article to be supported.

7. A support comprising an inner member and outer concentrically spaced enclosure member having a transverse wall, an annular rubber element disposed within said space to entirely fill the same and being permanently bonded to said members in spaced relation to said transverse wall to provide an air chamber, one of said members being adapted to serve as a fixed support, and means for connecting the other of said members to the article to be supported.

8. The combination set forth in claim 6 further characterized in that the bottom of said cup-shaped element is axially spaced from said inner member and from said rubber element to form an air chamber beneath said resilient element and inner member to supplement the supporting action thereof.

ALFRED WEILAND.